(12) United States Patent
Floyd

(10) Patent No.: US 8,781,807 B2
(45) Date of Patent: Jul. 15, 2014

(54) DOWNHOLE SENSOR MODBUS DATA EMULATOR

(76) Inventor: Raymond E. Floyd, Cody, WY (US)

( * ) Notice: Subject to any disclaimer, the term of this patent is extended or adjusted under 35 U.S.C. 154(b) by 771 days.

(21) Appl. No.: 13/016,429

(22) Filed: Jan. 28, 2011

(65) Prior Publication Data

US 2012/0194351 A1    Aug. 2, 2012

(51) Int. Cl.
    *G06G 7/58*      (2006.01)
    *G06F 9/455*      (2006.01)
    *G05B 17/02*      (2006.01)

(52) U.S. Cl.
    CPC .................................... *G05B 17/02* (2013.01)
    USPC ............................................. 703/10; 703/23

(58) Field of Classification Search
    USPC ....................................................... 703/10, 23
    See application file for complete search history.

(56) References Cited

U.S. PATENT DOCUMENTS

| | | | |
|---|---|---|---|
| 4,604,699 A * | 8/1986 | Borcherdt et al. | 702/15 |
| 5,924,499 A * | 7/1999 | Birchak et al. | 175/50 |
| 6,396,415 B1 | 5/2002 | Bulmer | |
| 6,414,905 B1 * | 7/2002 | Owens et al. | 367/83 |
| 7,282,698 B2 | 10/2007 | Childers | |
| 7,434,619 B2 | 10/2008 | Rossi et al. | |
| 7,994,932 B2 | 8/2011 | Huang et al. | |
| 8,260,872 B1 * | 9/2012 | Smaidris et al. | 709/208 |
| 8,572,583 B2 | 10/2013 | Bae et al. | |
| 8,600,717 B2 | 12/2013 | Rashid et al. | |
| 2002/0040274 A1* | 4/2002 | Yin et al. | 702/7 |
| 2002/0176441 A1* | 11/2002 | Swales et al. | 370/465 |
| 2003/0040881 A1* | 2/2003 | Steger et al. | 702/123 |
| 2005/0206335 A1* | 9/2005 | Strike et al. | 318/439 |
| 2006/0242501 A1* | 10/2006 | Kimelman et al. | 714/724 |
| 2007/0247328 A1* | 10/2007 | Petrovic et al. | 340/853.7 |
| 2008/0086270 A1* | 4/2008 | Mathiszik | 702/9 |
| 2009/0166033 A1* | 7/2009 | Brouwer et al. | 703/2 |
| 2009/0326903 A1* | 12/2009 | Ludwig | 703/16 |
| 2011/0011595 A1* | 1/2011 | Huang et al. | 703/6 |

\* cited by examiner

*Primary Examiner* — Dwin M Craig

(57) ABSTRACT

In order to simulate the inputs from a downhole sensor (DHS), RTD type sensors are typically employed, externally heated, and the input provided into an interface unit. At best such an approach provides a solution that is cumbersome and not reliably repeatable. Such temporary inputs seldom provide the equivalent communications protocol verification between the surface controller of the DHS and the external communications device. DHS units commercially available use different register addresses for the requested data, as well as a variation in the number of parameters expected from the DHS itself. The number of parameters may range from 3 to 7 based on the vendor unit selected. In the proposed system, a number of potentiometers are used to provide a variable signal level to the microprocessor, acting as variable parameters from the DHS sensor, the settings of which can be repeated for reliable test or regression test results.

1 Claim, 4 Drawing Sheets

| Position | Description | Content |
| --- | --- | --- |
| 0 | Header, Control | FFFFFF (HEX) |
| 1 | Input 1 Control | FFFF01 (HEX) |
| 2 | Input 1 1st Register Address | 03nnnn (HEX) |
| 3 | Input 1 2nd Register Address | 03nnnn (HEX) |
| 4 | Input 1 3rd Register Address | 04nnnn (HEX) |
| 5 | Input 2 Control | FFFF02 (HEX) |
| 6 | Input 2 1st Register Address | 04nnnn (HEX) |
| 7 | Input 2 2nd Register Address | 03nnnn (HEX) |
| 8 | Input 2 3rd Register Address | 04nnnn (HEX) |
| 9 | Input 3 Control | FFFF03 (HEX) |
| 10 | Input 3 1st Register Address | 04nnnn (HEX) |
| 11 | Input 3 2nd Register Address | 04nnnn (HEX) |
| 12 | Input 3 3rd Register Address | 04nnnn (HEX) |
| 13 | Input 7 Control | FFFF07 (HEX) |
| 14 | Input 7 1st Register Address | 03nnnn (HEX) |

FIG. 3

DOWNHOLE SENSOR MODBUS DATA EMULATOR

FIELD OF THE INVENTION

This invention relates to an assembly and application program used to provide equivalent signals for simulation of downhole sensor output signals, or other devices used in support of submersible equipment operation.

BACKGROUND

There are no known commercial downhole sensor (DHS) simulators available. In order to simulate the inputs from a DHS, RTD temperature sensors may be employed, externally heated, and the input provided into the interface unit. At best such an approach provides a solution that is cumbersome and typically not repeatable. Such temporary inputs also seldom provide the equivalent communications protocol verification between the surface controller of the DHS and the external communications device employed as part of the submersible equipment string.

Each DHS commercially available also uses different register addresses for the requested data. Additionally, the number of parameters expected from the DHS itself, may range from 3 to 7, depending on the vendor's DHS offering. Having to employ physical equipment for each possible type of DHS is cumbersome, time consuming, and expensive, as each possible DHS installed must be available for test and system validation.

SUMMARY OF THE INVENTION

In a preferred embodiment, the present invention is the design and implementation of an assembly and application program that simulates signals generated by downhole sensors through interface control units. The downhole interface control units provide communications protocol for external devices to retrieve the simulated downhole sensor measurements. Inputs that are simulated include Intake Pressure, Intake Temperature, Motor Temperature, Vibration in X, Vibration in Y, Discharge Pressure, and Motor Winding Leakage. The system also provides for baud rate, parity, and stop bit selection, thus allowing for many variations in the downhole sensor configuration.

BRIEF DESCRIPTION OF THE DRAWINGS

FIG. 3 is a detailed layout of the preferred embodiment of the downhole sensor signal simulator input data and data address assignment table.

DETAILED DESCRIPTION OF THE PREFERRED EMBODIMENT

Figure 1:
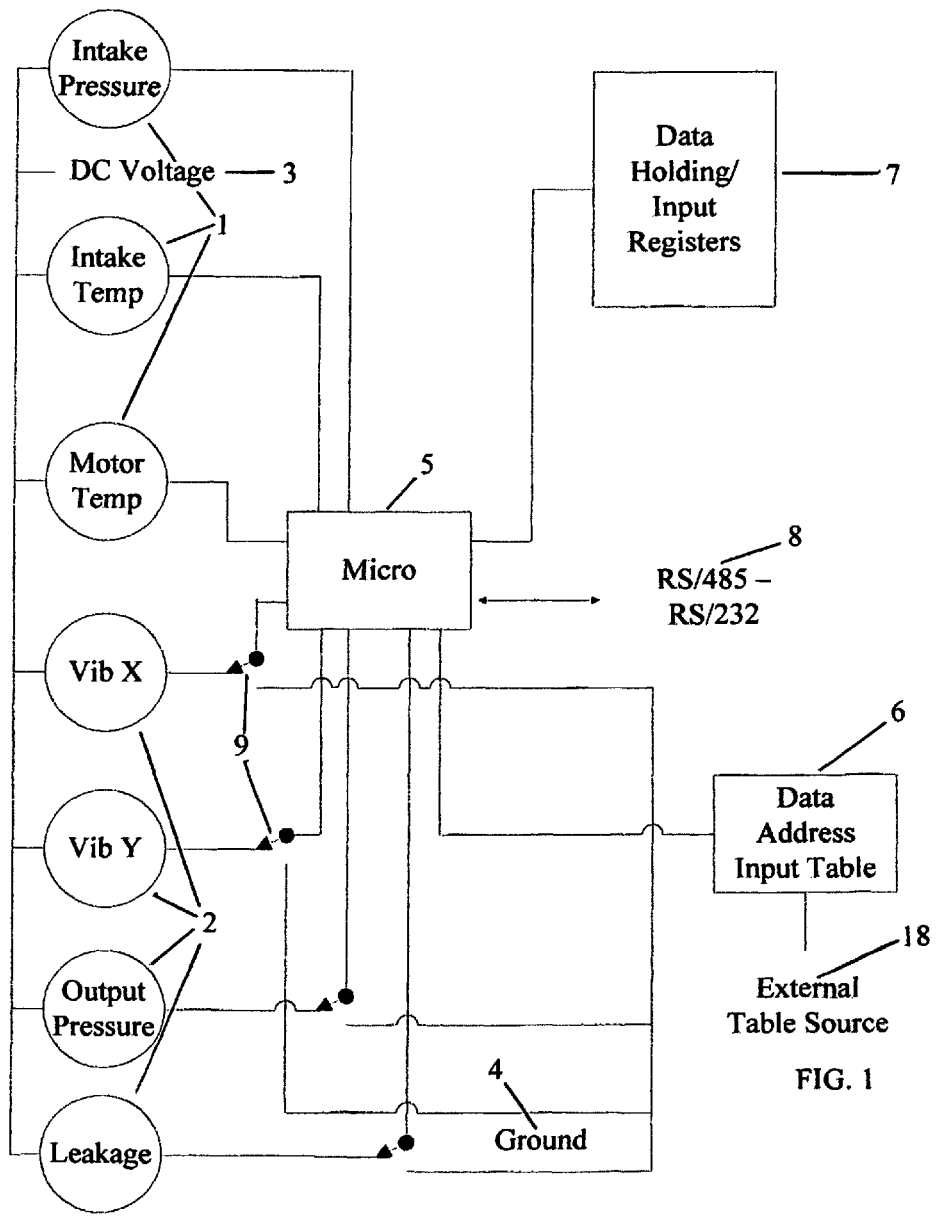
FIG. 1 is the general layout of the preferred embodiment of the downhole sensor signal simulator.

The preferred embodiment of the downhole sensor (DHS) data simulator is illustrated in FIG. 1. The unit is assembled with a number of potentiometers 1, 2 which are used to provide a variable signal level to the microprocessor 5, acting as variable parameters from the well sensor (DHS). The potentiometers 1, 2 are connected to a DC power supply 3, providing a range of 0 to 10 VDC. This range provides voltages that can represent temperature, pressure, vibration, and leakage variables, where the exact value is not critical, however the variation is important to the processing unit, where it will be scaled appropriately.

In the preferred embodiment three of the potentiometers 1—Intake Pressure, Intake Temp, and Motor Temp are wired directly into the microprocessor 5 as they are present in all current DHS systems. Four of the potentiometers 2—Vib X, Vib Y, Discharge Pressure, and Leakage are wired through switches 9, either providing a 0 to 10 VDC 3 input signal or Ground 4 as the input to the microprocessor 5. These latter four signals are optional with the DHS being employed, and vary by vendor and vendor DHS model. In some implementations of this unit, a meter with selection switch or multiple meters (not shown) could be included in the analog inputs of the microprocessor 5 to indicate the exact voltage being converted (for use in calibration testing or where repeatable regression testing is required).

Figure 4:
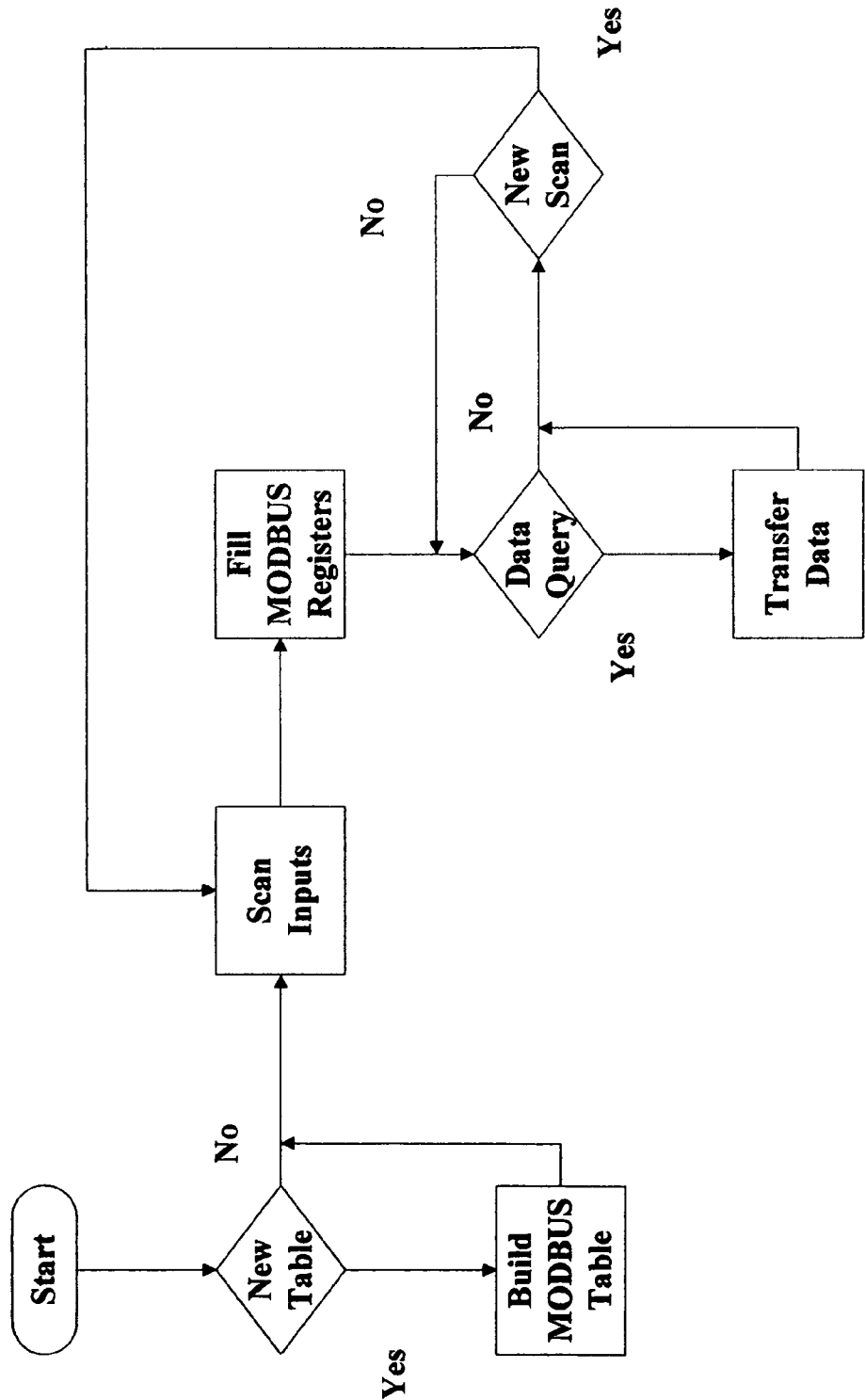
FIG. 4 is a simplified flow diagram of the preferred embodiment of the downhole sensor signal simulator control application.

The microprocessor 5 contains the application program which will scan the analog to digital convertor outputs, and place the resulting digital two bytes of data into the appropriate data registers 7, depending on the information contained in the Data Address Input Table 6. When the microprocessor 5 is queried from an external device, via the RS/485 8 interface (other communication protocols could be implemented as dictated by the external device requirements), it will be in response to a communications function call. The microprocessor 5 will interpret the request for information (Function Codes 03 or 04), determine the specific addresses requested, format a data return, and send the requested data to the external device. This sequence is illustrated in FIG. 4.

Figure 2:
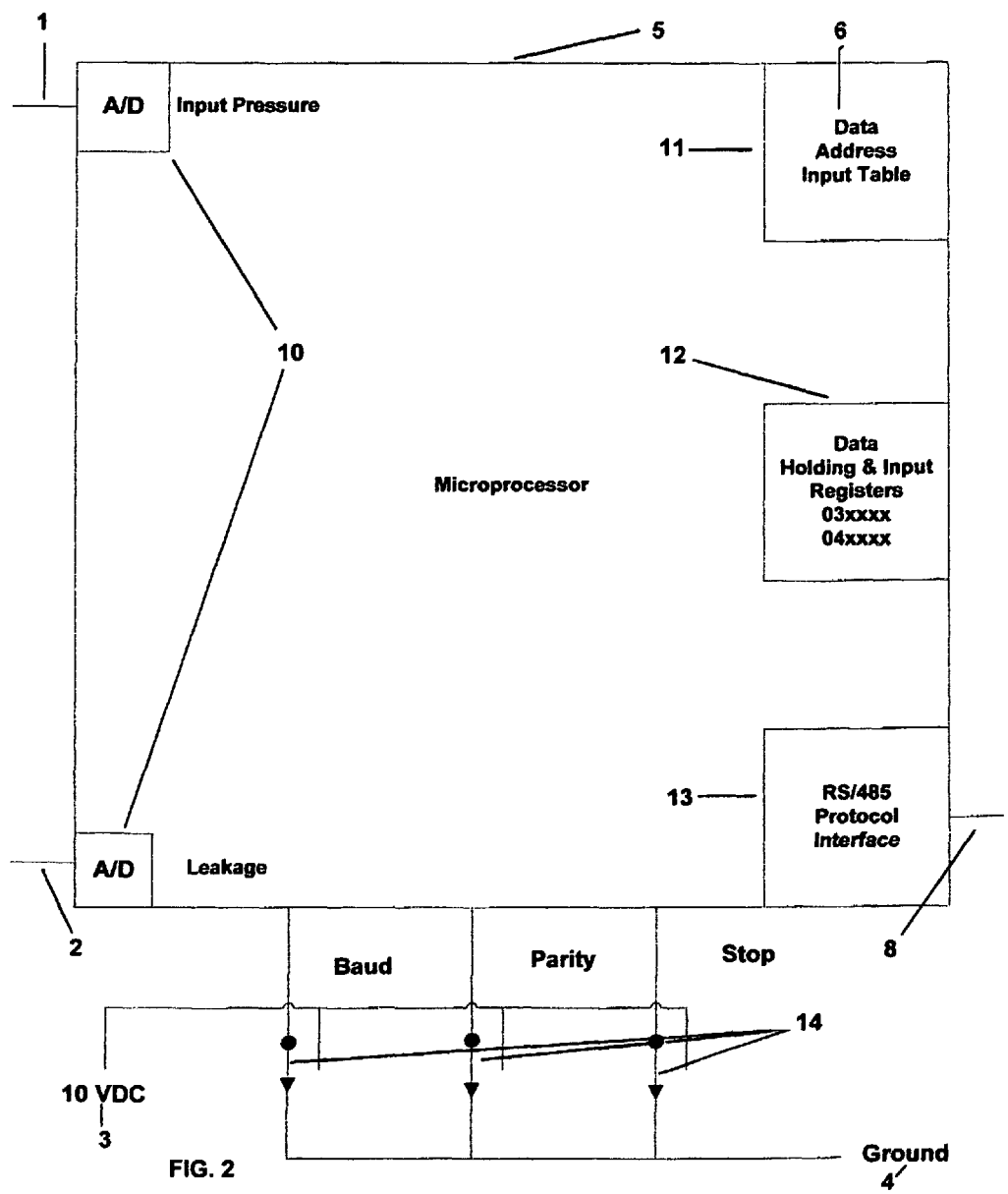
FIG. 2 is a detailed layout of the preferred embodiment of the downhole sensor signal simulator, including the baud rate, parity selection, and stop bit selection inputs.

The microprocessor 5 is illustrated in greater detail in FIG. 2. The inputs, as previously described are analog signals varying from 0 to 10 VDC, with inputs 1 being directly connected and inputs 2 being switched between ground and a 0 to 10 VDC signal. All of the inputs connect to analog to digital converters 10 within the microprocessor 5. The microprocessor 5 will scan the inputs on a periodic basis, real-time changes are not critical, and store the digital data into the appropriate Holding or Input Registers 12. The register destination is based on the information supplied in the Data Address Input Table 11. The Data Address Input Table 11 is an external device such as a flash drive, memory stick, or other similar device containing the address assignments for the data required to service any particular external requirement. For ease of implementation, each device's data requirements are in a standard format (FFFFnn HEX), where the nn identifies the start of a new DHS set of address requirements, reference FIG. 3. The illustration given in FIG. 3 shows three devices, each providing three emulated inputs, while one of the three also includes a fourth input, input 7. The data address locations follow the DHS assignment input and will range from three to seven in number.

The microprocessor 5 will build an internal cross reference table (not shown) to allow mapping of each input 1, 2 to be mapped into the Data Holding and Input Registers 12 as dictated by the Data Address Input Table entries. Each of the input signals will be mapped into their corresponding Holding or Input Register by the microprocessor 5, and updated on each periodic scan.

When the external device initiates a request for current data, the microprocessor 5 will decode the request (in a standard format of Function Code Field, starting address, and consecutive register count), and provide a response (in a standard format of Function Code Field, byte count, followed by the data high byte, data low byte, repeated until all of the requested data has been sent). For example if a request for data were received, it would appear similar to:

04 0001 0004

This request represents a query for the current status of four Holding Registers, starting with Holding Register 1. The microprocessor 5 will access the appropriate Input Registers 12, and format a return record similar to:

04 08 IPHi IPLo DPHi DPLo ITHi ITLo MTHi MTLo where the xxHi and xxLo represent the high and low bytes of the particular data requested. A common implementation would be through the use of MODBUS, but a number of alternatives could be used as dictated by the external device requirements. The changes would be internal to the microprocessor 5 application.

Three switches 14 have been included in the preferred embodiment to provide variation in communications definition, allowing for baud rates of 9600 and 19.2K, parity selection of Odd or Even, and stop bit selection of 0 or 1 bits. Additional variations could be implemented through the use of rotary switches or multi-pole switches.

What is claimed is:

1. An apparatus for simulation of a down hole sensor system consisting of; processor communicatively coupled to a non-transitory memory, wherein there are computer executable instructions that when executed by the processor perform the following;

generate at least two simulated input variables representing at least two down hole metrics selected from the list comprising; pump intake pressure, pump intake temperature, motor temperature, vibration in the X axis, vibration in the Y axis, pump discharge pressure and power cable leakage current;

an analog to digital converter coupled to said processor wherein said selected metrics are measured by said analog to digital converter and populated with data values based upon the simulated measurements.

* * * * *